US012652245B2

(12) United States Patent
Jain et al.

(10) Patent No.:　US 12,652,245 B2
(45) Date of Patent:　　Jun. 9, 2026

(54) MULTI-HOMED LAYER-2 (L2) SERVICE INSERTION ENTERPRISE FABRIC NETWORKS

(71) Applicant: Cisco Technology, Inc., San Jose, CA (US)

(72) Inventors: Prakash C. Jain, Fremont, CA (US); Sanjay Kumar Hooda, Pleasanton, CA (US); Aaditya Nitin Vadnere, Indore (IN); Kedar Sudhir Karmarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 18/380,457

(22) Filed: Oct. 16, 2023

(65) Prior Publication Data

US 2025/0126060 A1　Apr. 17, 2025

(51) Int. Cl.
H04L 45/00　　(2022.01)
(52) U.S. Cl.
CPC ................................... H04L 45/66 (2013.01)
(58) Field of Classification Search
CPC . H04L 12/4633; H04L 41/0894; H04L 45/66; H04L 45/74
See application file for complete search history.

(56) References Cited

U.S. PATENT DOCUMENTS

| | | | |
|---|---|---|---|
| 8,953,590 B1 | 2/2015 | Aggarwal et al. | |
| 2019/0058692 A1* | 2/2019 | Mittal | H04L 12/4633 |
| 2019/0245779 A1 | 8/2019 | Jonnalagadda et al. | |
| 2020/0177539 A1* | 6/2020 | Mittal | H04L 47/825 |
| 2021/0075767 A1 | 3/2021 | Jain et al. | |
| 2022/0021610 A1* | 1/2022 | Kreger-Stickles | H04L 47/125 |
| 2022/0078037 A1 | 3/2022 | Mishra et al. | |
| 2022/0272033 A1* | 8/2022 | Jain | H04L 45/302 |

OTHER PUBLICATIONS

Search Report and Written Opinion for International Application No. PCT/US2024/049915, Dated Jan. 22, 2025, 15 pages.

* cited by examiner

*Primary Examiner* — Donald L Mills
(74) *Attorney, Agent, or Firm* — Lee & Hayes, P.C.

(57)　　　　　　ABSTRACT

Techniques and architecture are described for L2 service insertion in a network. More particularly, the techniques and architecture provide for monitoring a L2 service, e.g., firewall, MAC address (instead of learning the MAC address) and registering/de-registering the service node (e.g., fabric border or edge or LISP service_etr) to the service control plane (e.g., LISP MSMR) based on this. This not only load-balances the traffic (per L2 flow) but also tracks it for node's liveliness. The techniques and architecture also provide L2 service insertion connected to a service border to allow for dynamic SGT based service, e.g., firewall, insertion for both software defined access (SDA) fabric and non-fabric deployments.

20 Claims, 8 Drawing Sheets

400 ⟍

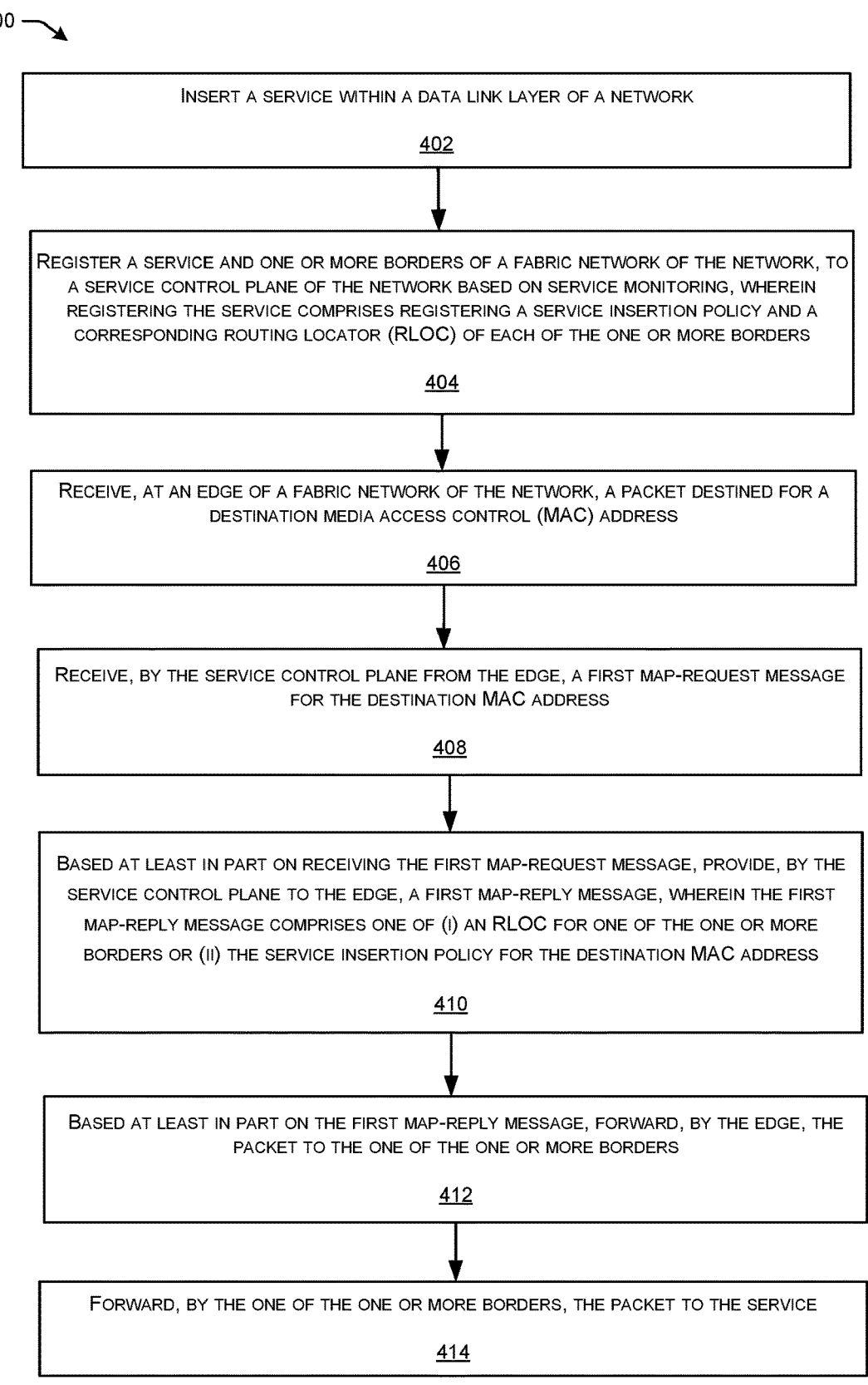

INSERT A SERVICE WITHIN A DATA LINK LAYER OF A NETWORK

402

REGISTER A SERVICE AND ONE OR MORE BORDERS OF A FABRIC NETWORK OF THE NETWORK, TO A SERVICE CONTROL PLANE OF THE NETWORK BASED ON SERVICE MONITORING, WHEREIN REGISTERING THE SERVICE COMPRISES REGISTERING A SERVICE INSERTION POLICY AND A CORRESPONDING ROUTING LOCATOR (RLOC) OF EACH OF THE ONE OR MORE BORDERS

404

RECEIVE, AT AN EDGE OF A FABRIC NETWORK OF THE NETWORK, A PACKET DESTINED FOR A DESTINATION MEDIA ACCESS CONTROL (MAC) ADDRESS

406

RECEIVE, BY THE SERVICE CONTROL PLANE FROM THE EDGE, A FIRST MAP-REQUEST MESSAGE FOR THE DESTINATION MAC ADDRESS

408

BASED AT LEAST IN PART ON RECEIVING THE FIRST MAP-REQUEST MESSAGE, PROVIDE, BY THE SERVICE CONTROL PLANE TO THE EDGE, A FIRST MAP-REPLY MESSAGE, WHEREIN THE FIRST MAP-REPLY MESSAGE COMPRISES ONE OF (I) AN RLOC FOR ONE OF THE ONE OR MORE BORDERS OR (II) THE SERVICE INSERTION POLICY FOR THE DESTINATION MAC ADDRESS

410

BASED AT LEAST IN PART ON THE FIRST MAP-REPLY MESSAGE, FORWARD, BY THE EDGE, THE PACKET TO THE ONE OF THE ONE OR MORE BORDERS

412

FORWARD, BY THE ONE OF THE ONE OR MORE BORDERS, THE PACKET TO THE SERVICE

MULTI-HOMED LAYER-2 (L2) SERVICE INSERTION ENTERPRISE FABRIC NETWORKS

TECHNICAL FIELD

The present disclosure relates generally to monitoring an inserted layer-2 (L2) service media access control (MAC) address (instead of learning the MAC address) and registering/de-registering the service node (e.g., a fabric network border or edge, or a locator ID separation protocol (LISP) service egress tunnel router (etr)) to a service control plane (e.g., LISP MSMR) based on this.

BACKGROUND

Multi-homed connection to layer-2 (L2), e.g., data link layer, services such as a firewall are becoming more popular in order to support redundancy while providing services insertion (e.g., firewall) into fabric networks. There are two problems to support such an arrangement. First, by default, the media access control (MAC) address can only be present on one fabric network node. However, for L2 services to be inserted, path redundancy for those services is required. Thus, it is important that the same firewall/service MAC address can be connected to more than one fabric network node. Second, once a path/link (or links) to the firewall service is down on one fabric network node, the switchover of the traffic needs to move to the other fabric network node that has the service (firewall), gracefully.

With more advanced networks becoming more common, this arrangement is becoming more important. For example, this may be due the number of end points continuously increasing (e.g., robots, Internet of Things (IoT), portable devices, etc.) and needing services from cloud/networks and hybrid cloud networks via fabric networks. To provide seamless connectivity and mobility at scale for these IoT devices, overlay software defines access/software defined networking (SDA/SDN) enterprise fabric networks have evolved and are becoming necessary for all future networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for L2 service insertion in the example networks of FIGS. 1 and 2, in accordance with the techniques and architecture described herein.

DESCRIPTION OF EXAMPLE EMBODIMENTS

Overview

Figure 1:
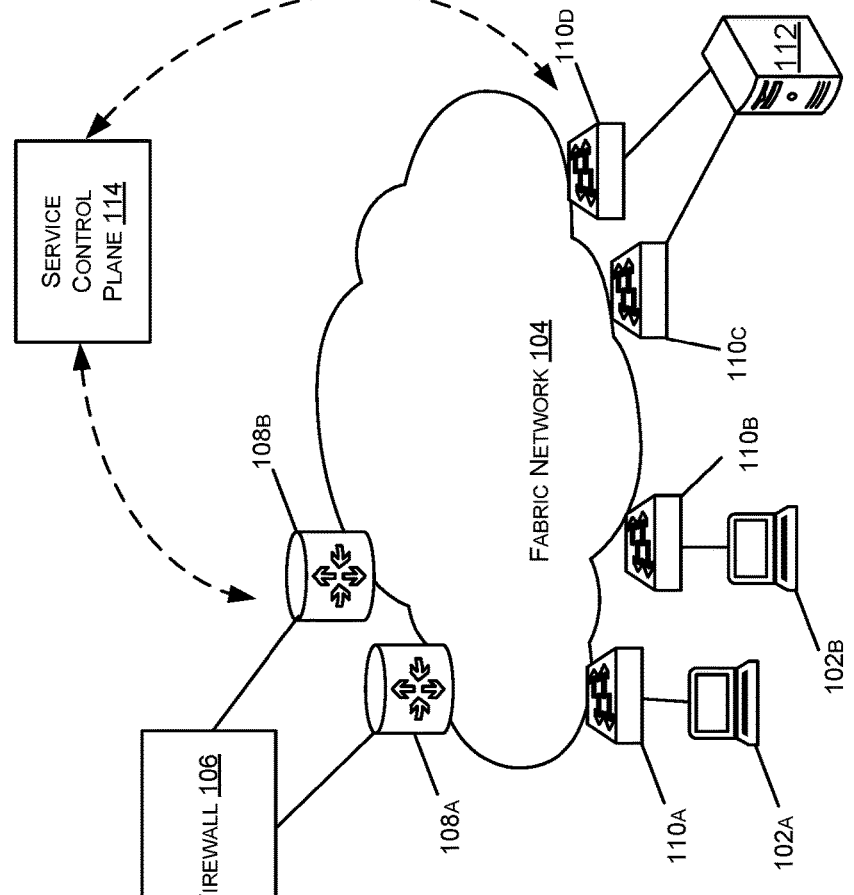
FIG. 1 schematically illustrates an example network arrangement that provides for L2 service insertion between fabric hosts of a fabric network, in accordance with techniques and architecture described herein.

The present disclosure provides techniques and architecture for monitoring an inserted layer-2 (L2), e.g., data link layer, service (e.g., firewall) media access control (MAC) address (instead of learning the MAC address), and registering/de-registering the service node (e.g., a fabric network border or edge, or a locator ID separation protocol (LISP) service egress tunnel router (etr)) to service control plane (e.g., LISP MSMR) based on this. This not only load-balances the traffic (per L2 flow) but also tracks it for node's liveliness.

More particularly, using a firewall insertion as a specific example, the techniques and architecture provide for firewall insertion between fabric hosts in at least two ways. In configurations, a first way may include a multi-homed L2 service (firewall) insertion with a gateway on the firewall. In such configurations, if the same mac address appears on two borders or fabric edges, this may cause "ping-ponging" in the fabric for the MAC address that is connected in such a manner. The techniques and architecture described herein address this problem by monitoring such a MAC address as opposed to learning the MAC address, which not only enables load-balancing of the network traffic (per traffic flow) but also tracks the network traffic for liveliness. In configurations, a second way may include a firewall insertion based on L2/MAC address between the hosts of a same subnet in the fabric network. Different devices and/or applications generally have different timing, performance, latency, addressing, network address translation (NAT), and/ or security requirements, which requires choosing between L2 or layer-3 (L3) overlay tunnels for connectivity and L2 or L3 service insertion based on these factors.

As an example, a method may include inserting a service within a data link layer of a network. The method may also include registering one or more borders of a fabric network of the network, to a service control plane of the network, wherein the registering comprises registering a service insertion policy and a corresponding routing locator (RLOC) of each of the one or more borders. The method may further include receiving, at an edge of a fabric network of the network, a packet destined for a destination media access control (MAC) address. The method may additionally include receiving, by the service control plane from the edge, a map-request message for the destination MAC address. The method may also include based at least in part on receiving the map-request message, providing, by the service control plane to the edge, a map-reply message, wherein the map-reply message comprises one of (i) an RLOC for one of the one or more borders or (ii) the service insertion policy for the destination MAC address. The method may further include based at least in part on the map-reply message, forwarding, by the edge, the packet to the one of the one or more borders. The method may additionally include forwarding, by the one of the one or more borders, the packet to the service.

EXAMPLE EMBODIMENTS

In accordance with configurations described herein, as previously noted, techniques and architecture are provided for inserting and monitoring layer-2 (L2, e.g., data link layer) service (e.g., firewall) based on monitoring of media access control (MAC) address (instead of learning the MAC address), and registering/de-registering the service node (e.g., a fabric network border or edge, or a locator ID separation protocol (LISP) service egress tunnel router (etr)) to the service control plane (e.g., LISP map server/map resolver (MSMR)) based on this. This not only load-balances the traffic (per L2 flow) but also tracks it for node's liveliness.

More particularly, using a firewall insertion as a specific example, the techniques and architecture described herein provide for firewall insertion between fabric hosts in at least two ways. In configurations, a first way may include a multi-homed L2 service (firewall) insertion with a gateway on the firewall. In such configurations, if the same MAC address appears on two borders or fabric edges, this may cause "ping-ponging" of traffic from hosts in the fabric network for the MAC addresses that are connected in such a manner. The techniques and architecture described herein address this problem by monitoring such a MAC address as opposed to learning the MAC address, which not only load-balances network traffic (per traffic flow) but also tracks the network traffic for liveliness. In configurations, a second way may include a firewall insertion based on L2/MAC address between the hosts of a same subnet in the fabric network. Different devices and/or applications generally have different timing, performance, latency, addressing, network address translation (NAT), and/or security requirements, which requires choosing between L2 or L3 overlay tunnels for connectivity and L2 or L3 service insertion based on these factors.

While there are techniques and architecture for fabric networks having L3/Internet Protocol (IP) address-based service insertion (using single-path or multi-path (e.g., equal-cost multi-path (ECMP)), L2/MAC address-based firewall/service insertion is not available, and in general is hard to implement. This is due to services (e.g., firewalls) usually needing to be connected via multiple service borders. If the same firewall/service MAC address is learned via multiple borders, it would cause L2 loops or flooding in the network because of ping pong of the same L2 packets among the multiple borders. Additionally, some of the application specific integrated circuits (ASICs) (forwarding engines) do not have a capability of setting appropriate L2/MAC address-based traffic steering and load balancing paths in ASICs as per the service insertion requirements. Additionally, the same is required by network users on the fabric network edges, where a server may be connected to the multiple fabric network edges. It should be noted that for both scenarios (fabric network borders and fabric network edges) described above, there is no need for a L2 connection between the two fabric network edges or fabric network borders.

As an example, existing L3 service insertion provisioning (which may operate via service_etr config and monitoring in SDA) may be modified to include L2 service insertion configuration as follows. In configurations, instead of monitoring 0/0 or firewall service IP route, gateway (GW) virtual MAC address (or global/router MAC address) of the firewall GW may be monitored (CLI: "database-mapping <gw-virtual-mac> [service-insertion <service-id> firewall] locator-set set1 service-etr"). Based on the above, the service border or service edge (or L2 service_etr) registers to the service control plane (e.g., LISP MSMR) with its RLOC IP address (from locator-set set1) and group-based (security group and/or destination group) service insertion policy within the virtual local area network (LAN) (VLAN) or L2 instance-id (extending the Service Insertion Registration/Border convergence mechanism for L2 for example). This L2 service border or service edge or (L2 service_etr) is not supported by legacy LISP protocol and/or solutions. The solution can also be extended across multisite using transit/cloud control plane (T-MSMR).

More particularly, in configurations, L2 service border(s) perform registration to the service control plane (e.g., MSMR) from an L2 instance (VLAN) with their RLOC IP and policy (security group tag (SGT) and/or destination group tag (DGT) based policies). When an edge (access node) boots up, the service control plane instructs the edge to install a default service insertion policy that traffic for any MAC address (destination) to be sent to a specific/default L2 service border to apply firewall service. This is first packet punt and forward policy for L2. There are at least two options for this. For example, unresolved traffic at the edge may be redirected to the appropriate L2 service border, which has all static or already known steering policies (e.g., pre-populated via L2 publisher server-subscriber (PUB-SUB)). Alternatively, drop unresolved traffic.

In configurations, as an example, traffic (packet) needs to go from a first host having a first MAC address, e.g., MAC1 to a second host having a second MAC address, e.g., MAC2. In this example, both the first host/MAC1 and the second host/MAC2 are already registered to the service control plane within their respective VLANs. In configurations, the first host/MAC1 and the second host/MAC2 may be registered to the service control plane within the same VLAN.

In configurations, a mapping-request may be sent by the edge to which the first host is coupled to resolve the second host (MAC2 in a corresponding SGT context) with the service control plane, which will return both the service border (SB, VLAN) and will also return the DGT corresponding to the second host to apply the service insertion policy. There are at least two options for this. For example, the service insertion policy may be applied at the edge. The forwarding plane triggers the mapping-request for the destination MAC in VLAN/SGT context to get the destination VLAN/DGT to apply the service insertion policy at the edge. The service control plane replies based on the destination MAC and the VLAN with the DGT for the SGT-DGT based policy. The forwarding plane on the edge already has the installed policy for the SGT-DGT in addition to the forwarding entry (map-cache) when the first host was learned/onboarded at the edge. In this case, the forwarding plane may regenerate the map-request on a DGT miss when the corresponding SGT-DGT for the service insertion policy is not available at the forwarding plane.

Alternatively, in configurations, the service insertion policy may be applied at the service control plane and the forwarding plane on the edge triggers resolution (mapping-request) in the corresponding SGT context for the destination MAC (second host). The service control plane replies after applying the policy according to the requesting node (the service border or a default border or the edge node). The forwarding plane may just install the forwarding entry at the edge (i.e., no SGT-DGT policy at the edge). This option assumes that the forwarding plane is able to generate the mapping-request in the corresponding SGT context for the destination MAC. While generating the mapping request, the edge also forwards the packet to the default service border. The policy may provide the firewall address or the service border IP address (based on who does the service insertion registration in the VLAN). In configurations, a separate service border may not be required in case the firewall can directly terminate VxLAN.

In configurations, the tagged packet is sent to the service border with the virtual network identifier (VNI) and SGT encapsulation. The service border decapsulates the packet and sends the packet to the firewall using VLAN. The service border IP address as a tunnel end point (TEP) in the packet encap or another indication/bit in the encapsulation header can be used to identify traffic that needs to be sent to the firewall (to differentiate return traffic from needing to go to the firewall). This helps in scenarios where the service border switch is also the gateway to the north south traffic of the network. The firewall processes the traffic and sends the traffic back to the service border using VLAN.

Since the packet encapsulation TEP is not IP/RLOC of the service border in the service overlay (or check forwarding bit=0) in the encapsulation header), the service border does a map cache query (or uses LISP PUB-SUB) for the second host's MAC, which will return the edge to which the second host is coupled (actual destination RLOC). The service control plane determines, based on the source of the mapping request, which node to resolve (service border or edge, request from service border in the same virtual network (VN)/instance does not resolve to same service border/VLAN/VNI). After applying the service, the service border sends the encapsulated packet to the edge to which the second host is coupled.

Accordingly, in configurations, a method includes inserting a service within a data link layer of a network. The method also includes registering a service and one or more borders of a fabric network of the network, to a service control plane of the network based on service monitoring, wherein the registering the service comprises registering a service insertion policy and a corresponding routing locator (RLOC) of each of the one or more borders. The method further includes receiving, at an edge of a fabric network of the network, a packet destined for a destination media access control (MAC) address. The method additionally includes receiving, by the service control plane from the edge, a first map-request message for the destination MAC address. The method also includes based at least in part on receiving the first map-request message, providing, by the service control plane to the edge, a first map-reply message, wherein the first map-reply message comprises one of (i) an RLOC for one of the one or more borders or (ii) the service insertion policy for the destination MAC address. The method further includes based at least in part on the first map-reply message, forwarding, by the edge, the packet to the one of the one or more service borders. The method additionally includes forwarding, by the one of the one or more borders, the packet to the service.

In some configurations, the method further comprises forwarding, by the service, the packet to the one of the one or more borders. In such configurations, the method also comprises receiving, by the service control plane from the one of the one or more borders, a second map-request message and based at least in part on receiving the second map-request message, providing, by the service control plane to the border, a second map-reply message, wherein the second map-reply message comprises an RLOC for the destination MAC address. The method additionally comprises forwarding, by the one of the one or more borders, the packet to the destination MAC address.

In further configurations, providing, by the service control plane to the edge, the first map-reply message, comprises providing, by the service control plane, a destination group tag for the service insertion policy and applying, by the edge, the service insertion policy, wherein applying the service insertion policy comprises the forwarding, by the edge, the packet to the one of the one or more borders connected to the service.

In additional configurations, providing, by the service control plane to the edge, the first map-reply message, comprises providing, by the service control plane to the edge, the first map-reply message, wherein the first map-reply message comprises the RLOC for one of the one or more borders connected to the service.

In some configurations, the method further comprises upon boot-up of the edge, providing, by the service control plane to the edge, the service insertion policy, wherein the service insertion policy comprises an instruction to route traffic destined for the destination MAC address to the one of the one or more borders to forward the traffic to the service to apply the service.

In further configurations, the method also comprises redirecting, by the edge, unresolved traffic to the one of the one or more borders.

In additional configurations, the method further comprises dropping, by the edge, unresolved traffic.

In some configurations, the service insertion policy is based at least in part on one of a security group tag (SGT) or a destination group tag (SGT) of traffic within the network.

Thus, the techniques and architecture provide for monitoring a L2 service, e.g., firewall, MAC address (instead of learning the MAC address) and registering/de-registering the service node (e.g., fabric border or edge or LISP service_etr) to the service control plane (e.g., LISP MSMR) based on this. This not only load-balances the traffic (per L2 flow) but also tracks it for node's liveliness. The techniques and architecture also provide L2 service insertion connected to a service border to allow for dynamic SGT based service, e.g., firewall, insertion for both SDA (software defined access) and non-SDA deployments.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example network arrangement 100 that provides for L2 service insertion between hosts 102a, 102b coupled to a fabric network 104 via edges 110a. 110b. As previously noted, using a firewall insertion as a specific example, the techniques and architecture described herein provide for firewall 106 insertion between fabric hosts 104a. 104b in at least two ways. In configurations, a first way may include a multi-homed L2 service (firewall) insertion with a gateway on the firewall 106. In such configurations, if a MAC address AA appears on two service borders 108a. 108b (or a second MAC address BB on two fabric edges 110c, 110d, for server 112), this may cause "ping-ponging" of traffic from hosts 102a, 102b between borders and edges in the fabric network for the MAC addresses that are connected in such a manner. The techniques and architecture described herein address this problem by monitoring such a MAC address AA or BB as opposed to learning the MAC address AA on the corresponding service borders 108a, 108b (or learning the MAC address BB on the corresponding edges 110c, 110d), which not only load-balances network traffic (per traffic flow) but also tracks the network traffic for liveliness. As will be discussed further herein, in configurations, a second way may include a firewall insertion based on L2/MAC address between the hosts of a same subnet in the fabric network. Different devices and/or applications generally have different timing, performance, latency, addressing, network address translation (NAT), and/or security requirements, which requires choosing between L2 or L3 overlay tunnels for connectivity and L2 or L3 service insertion based on these factors.

While there are techniques and architecture for fabric networks having L3/Internet Protocol (IP) address-based service insertion (using single-path or multi-path (e.g., equal-cost multi-path (ECMP)), L2/MAC address-based firewall/service insertion is not available, and in general is hard to implement. This is due to services (e.g., firewalls) usually needing to be connected via multiple service borders. If the same firewall/service MAC address is learned via multiple borders, e.g., service borders 108*a*. 108*b*, it would cause L2 loops or flooding in the network because of ping pong of the same L2 packets among the multiple borders. Additionally, some of the application specific integrated circuits (ASICs) (forwarding engines) do not have a capability of setting appropriate L2/MAC address-based traffic steering and load balancing paths in ASICs as per the service insertion requirements.

Additionally, the same is required by network users on the fabric network edges, e.g., edges 110*a*. 110*b*, where a server, e.g., server 112 may be connected to the multiple fabric network edges. It should be noted that for both scenarios (fabric network borders and fabric network edges) described above, there is no need for a L2 connection between the two fabric network edges 110*a*. 110*b* or fabric network service borders 108*a*. 108*b*.

As an example, existing L3 service insertion provisioning (which may operate via service_etr config and monitoring in SDA) may be modified to include L2 service insertion configuration as follows. In configurations, instead of monitoring 0/0 or firewall service IP route, gateway (GW) virtual MAC address (or global/router MAC address) of the firewall GW may be monitored (database-mapping <gw-virtual-mac> [service-insertion <service-id> firewall] locator-set set1 service_etr). Based on the above, the service borders 108*a*. 108*b* or service edge 110*c*, 110*d* (or L2 service_etr) registers to the service control plane 114 (e.g., LISP MSMR) with its RLOC IP address (from locator-set set1) and group-based (security group and/or destination group) service insertion policy within the virtual local area network (LAN) (VLAN) or L2 instance-id (extending the Service Insertion Registration/Border convergence mechanism for L2 for example). This L2 service border or service edge or (L2 service_etr) is not supported by legacy LISP protocol and/or solutions. The solution can also be extended across multi-sites using transit/cloud control plane (T-MSMR).

Figure 2:
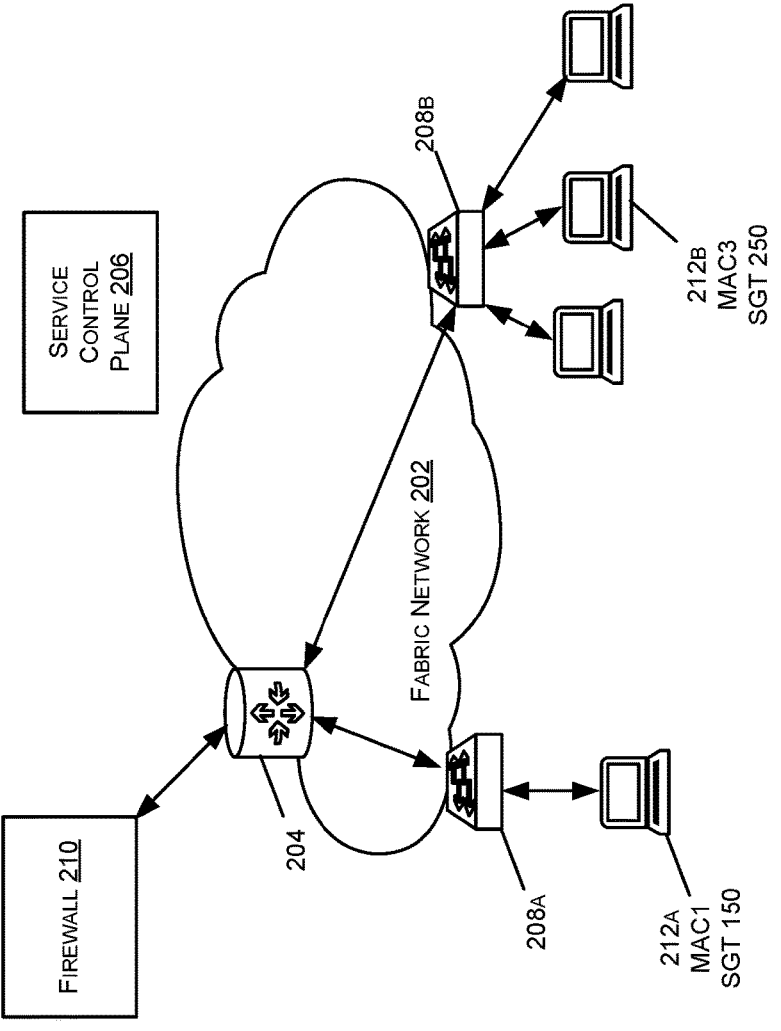
FIG. 2 schematically illustrates an example network arrangement that includes a fabric network that provides for dynamic security group tag (SGT) based L2 firewall/service insertion for both SDA and non-SDA deployments, in accordance with techniques and architecture described herein.

FIG. 2 schematically illustrates an example network arrangement 200 that includes a fabric network 202 that provides for dynamic security group tag (SGT) based L2 firewall/service insertion for both SDA and non-SDA deployments. In configurations, one or more L2 service border(s) 204 perform registration to a service control plane 206 (e.g., MSMR) from an L2 instance (VLAN) with their RLOC IP and policy (SGT and/or destination group tag (DGT) based policies). When an edge, e.g., edge 208*a*. (access node) boots up, the service control plane 206 instructs the edge 208*a* to install a default service insertion policy that traffic for any MAC address (destination) to be sent to a specific/default L2 service border, e.g., service border 204, to apply firewall service, e.g., firewall 210. This is first packet punt and forward policy for L2. There are at least two options for this. For example, unresolved traffic at the edge 208*a* may be redirected to the appropriate L2 service border, which has all static or already known steering policies (e.g., pre-populated via L2 publisher server-subscriber (PUB-SUB)). Alternatively, drop or flood unresolved traffic at the edge 208*a*.

In configurations, as an example, traffic (packet) needs to go from a first host 212*a* having a first MAC address, e.g., MAC1, and SGT 150 to a second host 212*b* having a second MAC address, e.g., MAC3, and SGT 250. In this example, both the first host/MAC1 and the second host/MAC3 are already registered to the service control plane within their respective VLANs. In configurations, the first host 212*a*/MAC1 and the second host 212*b*/MAC3 may be registered to the service control plane 206 within the same VLAN.

In configurations, a mapping-request may be sent by the edge 208*a* to which the first host 212*a* is coupled to resolve the second host 212*b* (MAC3 in a corresponding SGT 250 context) with the service control plane 206, which will return both the service border (204. VLAN) and will also return the DGT corresponding to the second host 212*b* to apply the service insertion policy. There are at least two options for this. For example, the service insertion policy may be applied at the edge 208*a*. The forwarding plane triggers the mapping-request for the destination MAC (MAC3) in VLAN/SGT 250 context to get the destination VLAN/DGT to apply the service insertion policy at the edge 208*a*. The service control plane 206 replies based on the destination MAC (MAC3) and the VLAN with the DGT for the SGT-DGT based policy. The forwarding plane on the edge 208*a* already has the installed policy for the SGT-DGT in addition to the forwarding entry (map-cache) when the first host 212*a* was learned/onboarded at the edge 208*a*. In this case, the forwarding plane may regenerate the map-request on a DGT miss when the corresponding SGT-DGT for the service insertion policy is not available at the forwarding plane.

Alternatively, in configurations, the service insertion policy may be applied at the service control plane 206 and the forwarding plane on the edge 208*a* triggers resolution (mapping-request) in the corresponding SGT 250 context for the destination MAC (MAC 3 for second host 212*b*). The service control plane 206 replies after applying the policy according to the requesting node (the service border or a default border or the edge node). The forwarding plane may just install the forwarding entry at the edge 208*a* (i.e., no SGT-DGT policy at the edge 208*a*). This option assumes that the forwarding plane is able to generate the mapping-request in the corresponding SGT context for the destination MAC, e.g., MAC3. While generating the mapping request, the edge 208*a* also forwards the packet to the default service border, e.g., service border 204. The policy may provide the firewall 210's IP address or the service border 204's IP address (based on who does the service insertion registration in the VLAN). In configurations, a separate service border may not be required in case the firewall can directly terminate VxLAN.

In configurations, the tagged packet is sent to the service border 204 with the (virtual network identifier) VNI and SGT encapsulation. The service border 204 decapsulates the packet and sends the packet to the firewall 210 using VLAN. The service border IP address as a tunnel end point (TEP) in the packet encap is used to identify traffic that needs to be sent to the firewall 210 (to differentiate return traffic from needing to go to the firewall 210). This helps in scenarios where the service border switch is also the gateway to the north south traffic of the network arrangement 200. The firewall 210 processes the traffic and sends the traffic back to the service border 204 using VLAN.

Since the packet encapsulation TEP is not IP/RLOC of the service border 204 in the service overlay (or check F bit=0?), the service border 204 does a map cache query (or uses LISP PUB-SUB) to the service control plane 206 for the second host's MAC, e.g., second host 212b MAC3, which will return the edge 206b to which the second host 212b is coupled (actual destination RLOC). The service control plane 206 determines, based on the source of the mapping request, which node to resolve (service border 204 or edge 206b, request from service border/VN does not resolve to same service border/VLAN/VNI). The service border 204 sends the encapsulated packet to the edge 206b, which then forwards the packet to the second host 212b.

FIGS. 3A-3D illustrate an example flow 300 of steps for L2 service insertion in a network, e.g., network arrangements 100 and 200. The example flow 300 includes nodes in the form of an app 302, an identity service engine (ISE) 304, a firewall/service router 306, a service egress tunnel router (ETR) 308, a service control plane 310 (e.g., map server/map resolver (MSMR)), a host 312, a first access switch 314, a second access switch 316 (e.g., locator ID separation protocol (LISP)), a forwarding access switch 318, a destination switch 320, a destination host 322, and an Internet border/RLOC 324.

Figure 3A:
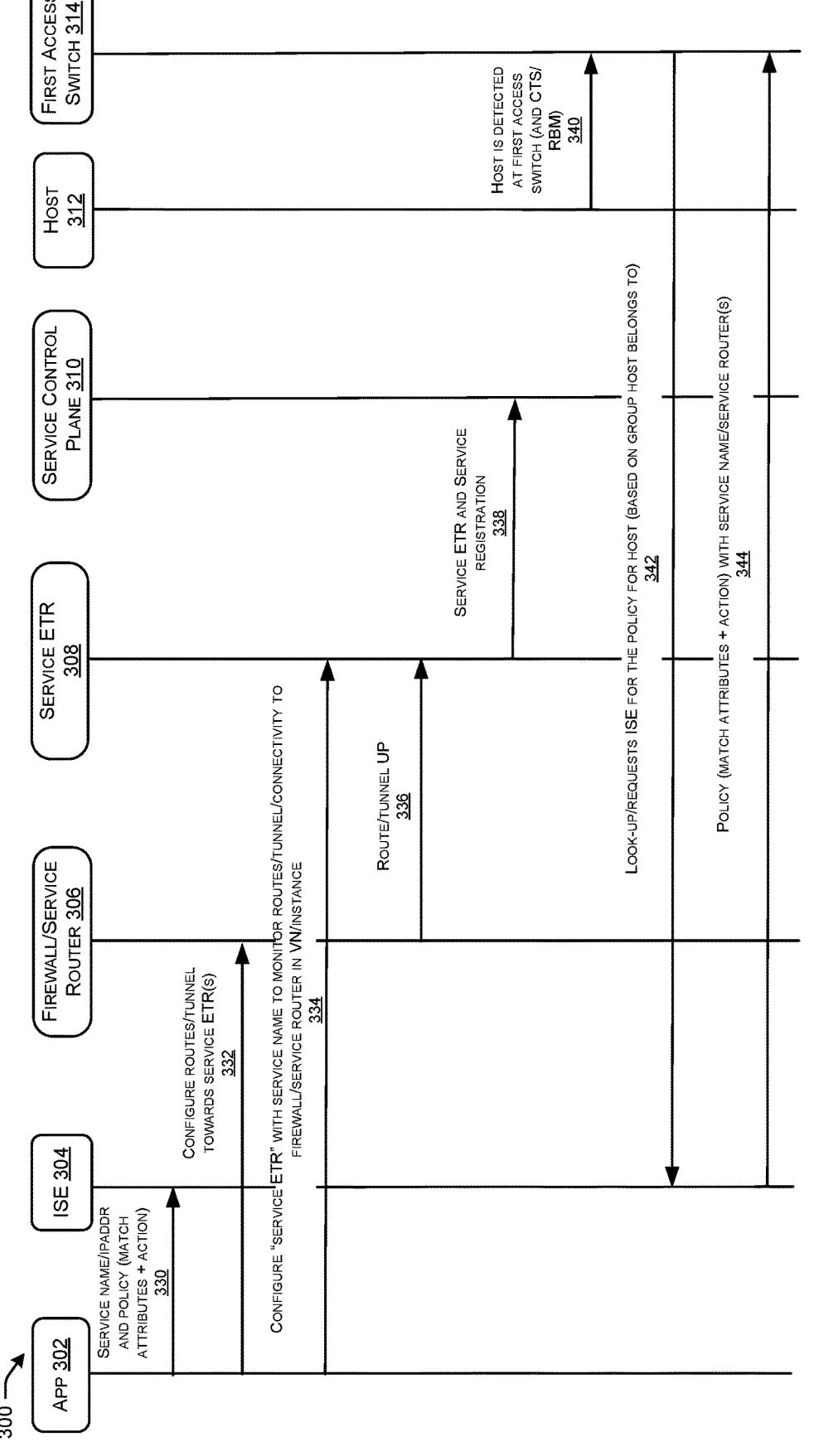
FIGS. 3A-3D schematically illustrate an example flow of steps for L2 service insertion in the example networks of FIGS. 1 and 2, in accordance with techniques and architecture described herein.

Referring to FIG. 3A, in the example flow 300, at 330 the app 302 sends service-name/IP address (ipaddr) and policy (match attributes+action) to the ISE 304. At 332, the app 302 sends configure routes/tunnel towards service ETR(s) to the firewall/service router 306. At 334, the app 302 configures "service ETR" with service name to monitor routes/tunnel/connectivity to firewall/service router in virtual network (VN)/Instance. At 336, the firewall/service router 306 sends route/tunnel UP to the service ETR 308. At 338, the service ETR 308 sends the service ETR and service registration to the service control plane 310. At 340, the host 312 is detected at the first access switch 314 and e.g., Cisco® TrustSec (CTS)/Cisco® round robin (RBN). At 342, the first access switch 314 sends look-up/requests the ISE for the policy (e.g., security policy) for the host 312 (based on which security group the host belongs to) to the ISE 304. At 344, the ISE 304 replies to the first access switch 314 with the policy (match attributes+action) with the service name/service router(s).

Figure 3B:
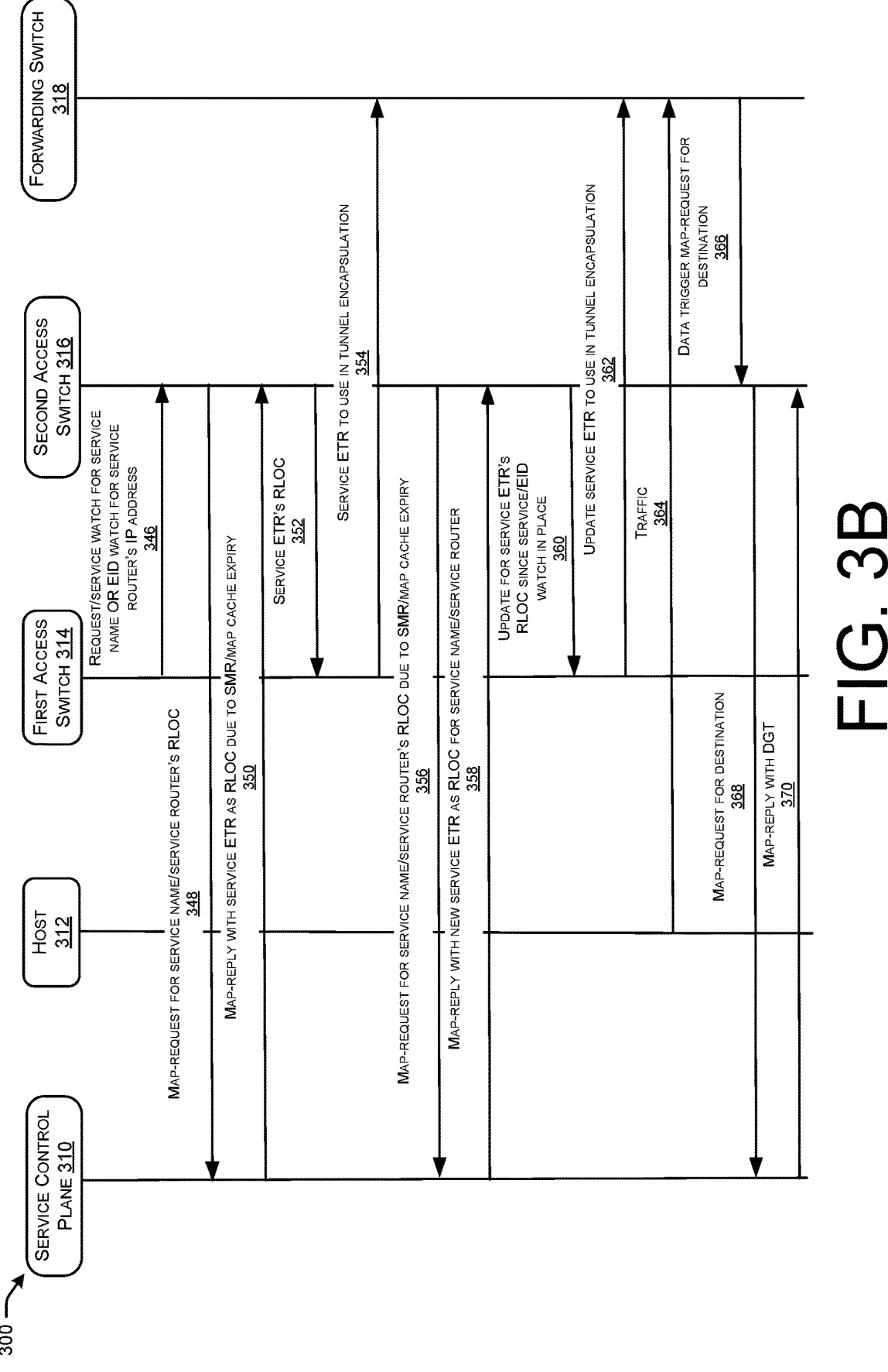

Referring to FIG. 3B, the flow 300 continues. At 346, the first access switch 314 sends a request/service-watch for the service name or an endpoint ID (EID) watch for the service router's IP address to the second access switch 316. At 348, the second access switch 316 sends a map-request for the service name/service router's RLOC to the service control plane 310. At 350, the service control plane 310 sends a map-reply with service ETR as RLOC for service name/service router to the second access switch 316. At 352, the second switch 316 sends the service ETR's RLOC to the first switch 314. At 354, the first switch 314 sends the service ETR to use in tunnel encapsulation to the forwarding switch 318. At 356, the second switch 316 sends a map-request for the service name/service router's RLOC due to service plane (MSMR)/map-cache expiry to the service control plane 310. At 358, the service control plane 310 sends a map-reply with new service ETR as RLOC for service name/service router to the second switch 316. At 360, the second switch 316 sends an update for service ETR's RLOC since service/EID watch is in place to the first switch 314. At 362, the first switch 314 sends update service ETR to use in tunnel encapsulation to the forwarding switch 318. At 364, the host 312 sends traffic to the forwarding switch 318. At 366, the forwarding access switch 318 sends a data trigger map-request for destination (from forwarding stage in SDA or policy stage in non-SDA) to the second access switch 316. At 368, the second switch 316 sends a map-request for destination to the service control plane 310. At 370, the service control plane 310 sends a map-reply with destination group tag (DGT) to second switch 316.

Figure 3C:
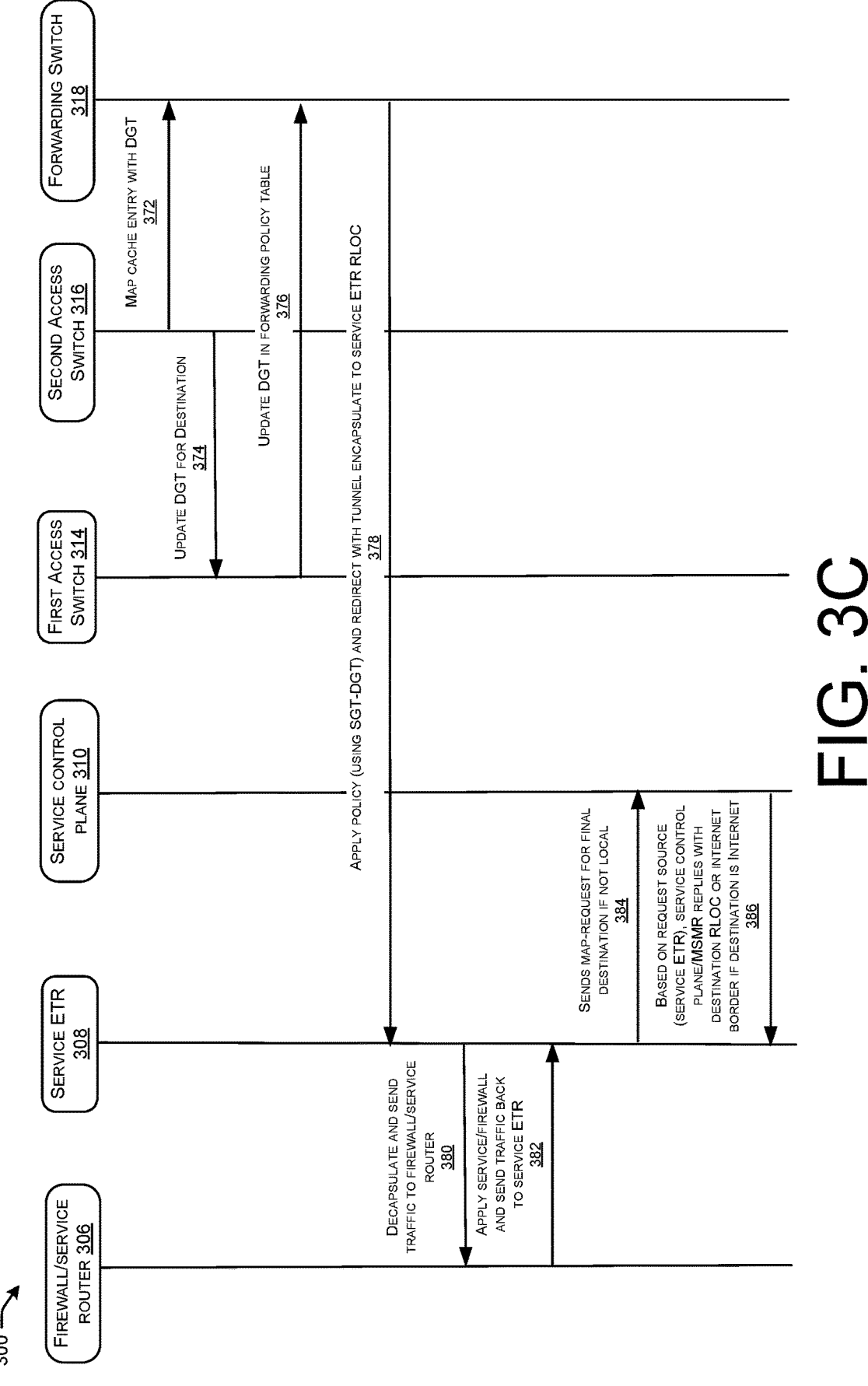

Referring to FIG. 3C, the flow 300 continues. At 372, the second access switch 316 sends a map-cache entry with the DGT to the forwarding switch 318. At 374, the second switch 314 sends an update DGT for destination to the first switch 314. At 376, the first switch 314 sends an update DGT in forwarding policy table to the forwarding switch 318. At 378, the forwarding switch 318 sends a message for apply policy (using SGT-DGT) and redirect with tunnel encapsulate to service ETR RLOC to the service ETR 308. At 380, the service ETR 308 decapsulates and sends the traffic to the firewall/service router 306. At 382, the firewall/service router 306 applies service/firewall and sends the traffic back to the service ETR 308. At 384, the service ETR 308 sends a map-request for final destination (if not local) to the service control plane 310. At 386, the service control plane 310, based on request source (service-ETR), replies with destination RLOC or Internet border if destination is in Internet to the service ETR 308.

Figure 3D:
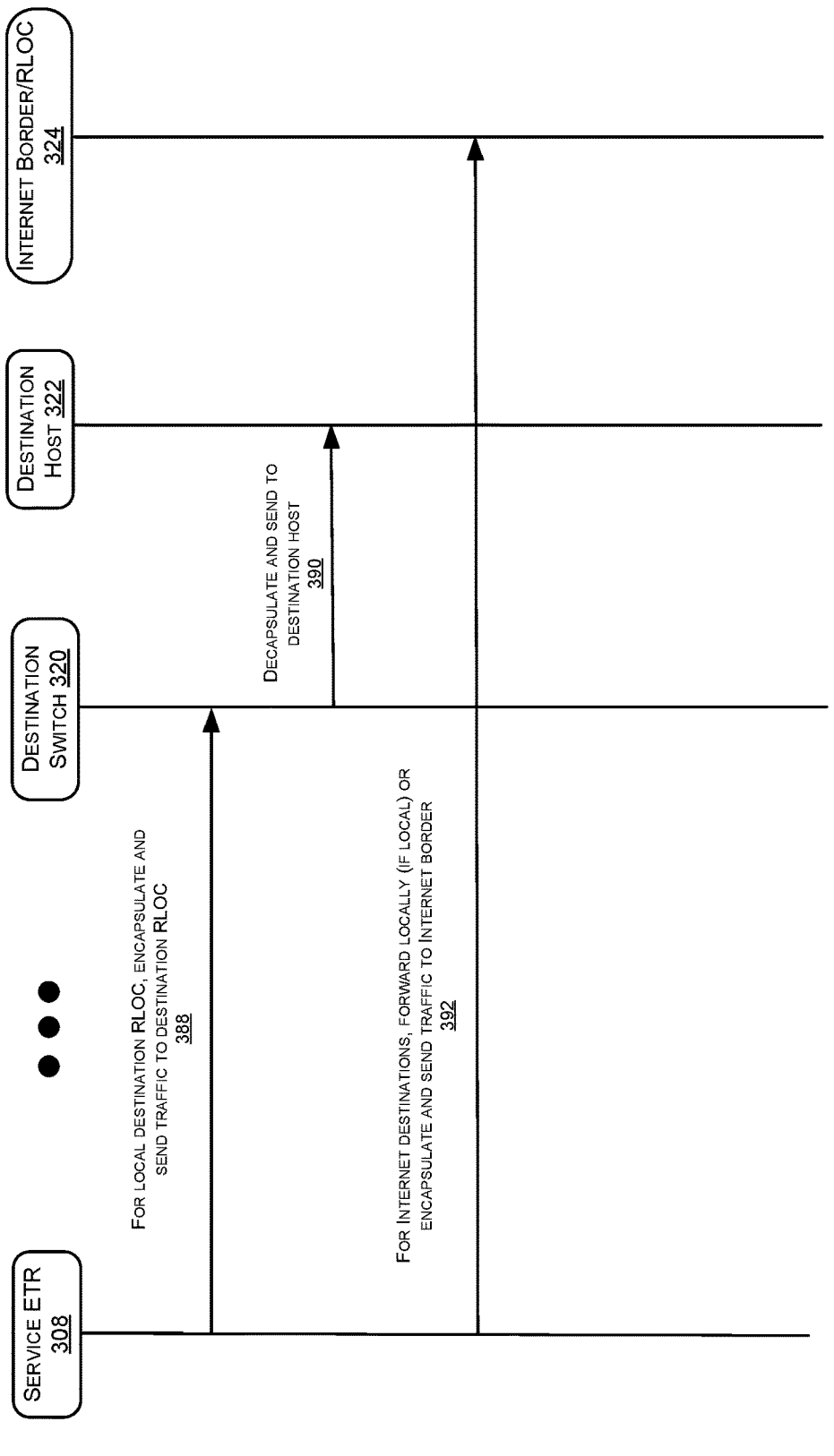

Referring to FIG. 3D, the flow 300 continues At 388, the service ETR 308, for local destination RLOC, encapsulates and sends traffic to destination RLOC via destination switch 320. At 390, the destination switch 320 decapsulates and sends the traffic to the destination host 322. At 392, the service ETR 308, for Internet destinations, forwards locally (if local) or encapsulates and sends traffic to the Internet border/RLOC 324.

FIG. 4 illustrates a flow diagram of an example method 400 and illustrates aspects of the functions performed at least partly by devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for L2 service insertion in a network, e.g., network arrangements 100 and 200. In some examples, the method 400 may be performed by a system comprising one or more processors and one or more non-transitory computer-readable media storing computer-executable instructions that, when executed by the one or more processors, cause the one or more processors to perform the method 400.

At 402, a service is inserted within a data link layer of a network. For example, when an edge, e.g., edge 208a, (access node) boots up, the service control plane 206 instructs the edge 208a to install a default service insertion policy that traffic for any MAC address (destination) to be sent to a specific/default L2 service border, e.g., service border 204, to apply firewall service, e.g., firewall 210. This is first packet punt and forward policy for L2.

At 404, a service and one or more borders of a fabric network of the network are registered to a service control plane of the network based on service monitoring, wherein registering the service comprises registering a service insertion policy and a corresponding routing locator (RLOC) of each of the one or more borders. For example, one or more L2 service border(s) 204 perform registration to a service control plane 206 (e.g., MSMR) from an L2 instance (VLAN) with their RLOC IP and policy (SGT and/or destination group tag (DGT) based policies). Additionally, as an example, in configurations, existing L3 service insertion provisioning (which may operate as service_etr config and monitoring in SDA) may be modified to include L2 service insertion configuration as follows. In configurations, instead of monitoring 0/0 or firewall service IP route, gateway (GW) virtual MAC address (or global/router MAC address) of the firewall GW may be monitored (database-mapping <gw-virtual-mac> [service-insertion <service-id> firewall] locator-set set1 service-etr). Based on the above, the service borders 108a, 108b or edges 110a, 110b (or L2 service_etr) registers to the service control plane 114 (e.g., LISP MSMR) with its RLOC IP address (from locator-set set1) and group-based (security group and/or destination group) service insertion policy within the virtual local area network (LAN) (VLAN) or L2 instance-id (extending the Service Insertion Registration/Border convergence mechanism for L2 for example). This L2 service border or service edge or (L2 service_etr) is not supported by legacy LISP protocol and/or solutions. The solution can also be extended across multi-sites using transit/cloud control plane (T-MSMR).

At 406, an edge of a fabric network of the network receives a packet destined for a destination media access control (MAC) address. For example, traffic (packet) needs to go from a first host 212a having a first MAC address, e.g., MAC1, and a SGT 150 to a second host 212b having a second MAC address, e.g., MAC3, and a SGT 250. In this example, both the first host/MAC1 and the second host/MAC3 are already registered to the service control plane within their respective VLANs. In configurations, the first host 212a/MAC1 and the second host 212b/MAC3 may be registered to the service control plane 206 within the same VLAN.

At 408, the service control plane receives, from the edge, a first map-request message for the destination MAC address. At 410, based at least in part on receiving the first map-request message, the service control plane provides a first map-reply message to the edge, wherein the first map-reply message comprises one of (i) an RLOC for one of the one or more borders or (ii) the service insertion policy for the destination MAC address. For example, a mapping-request may be sent by the edge 208a to which the first host 212a is coupled to resolve the second host 212b (MAC3 in a corresponding SGT 250 context) with the service control plane 206, which will return both the service border (204.

VLAN) and will also return the DGT corresponding to the second host 212b to apply the service insertion policy. There are at least two options for this. For example, the service insertion policy may be applied at the edge 208a. The forwarding plane triggers the mapping-request for the destination MAC (MAC3) in VLAN/SGT 250 context to get the destination VLAN/DGT to apply the service insertion policy at the edge 208a. The service control plane 206 replies based on the destination MAC (MAC3) and the VLAN with the DGT for the SGT-DGT based policy. The forwarding plane on the edge 208a already has the installed policy for the SGT-DGT in addition to the forwarding entry (map-cache) when the first host 212a was learned/onboarded at the edge 208a. In this case, the forwarding plane may regenerate the map-request on a DGT miss when the corresponding SGT-DGT for the service insertion policy is not available at the forwarding plane.

Alternatively, in configurations, the service insertion policy may be applied at the service control plane 206 and the forwarding plane on the edge 208a triggers resolution (mapping-request) in the corresponding SGT 250 context for the destination MAC (MAC 3 for second host 212b). The service control plane 206 replies after applying the policy according to the requesting node (the service border or a default border or the edge node). The forwarding plane may just install the forwarding entry at the edge 208a (i.e., no SGT-DGT policy at the edge 208a). This option assumes that the forwarding plane is able to generate the mapping-request in the corresponding SGT 250 context for the destination MAC. e.g., MAC3. While generating the mapping request, the edge 208a also forwards the packet to the default service border, e.g., service border 204. The policy may provide the firewall 210's IP address or the service border 204's IP address (based on who does the service insertion registration in the VLAN). In configurations, a separate service border may not be required in case the firewall can directly terminate VxLAN.

At 412, based at least in part on the first map-reply message, the edge forwards the packet to the one of the one or more borders. At 414, the one of the one or more borders forwards the packet to the service. For example, in configurations, the tagged packet is sent to the service border 204 with the (virtual network identifier) VNI and SGT encapsulation. The service border 204 decapsulates the packet and sends the packet to the firewall 210 using VLAN. The service border IP address as a tunnel end point (TEP) in the packet encap is used to identify traffic that needs to be sent to the firewall 210 (to differentiate return traffic from needing to go to the firewall 210). This helps in scenarios where the service border switch is also the gateway to the north south traffic of the network arrangement 200. The firewall 210 processes the traffic and sends the traffic back to the service border 204 using VLAN.

Accordingly, in accordance with configurations described herein, the techniques and architecture provide for monitoring a L2 service, e.g., firewall, MAC address (instead of learning the MAC address) and registering/de-registering the service node (e.g., fabric border or edge or LISP service_etr) to the service control plane (e.g., LISP MSMR) based on this. This not only load-balances the traffic (per L2 flow) but also tracks it for node's liveliness. The techniques and architecture also provide L2 service insertion connected to a service border to allow for dynamic SGT based service, e.g., firewall, insertion for both SDA and non-SDA deployments.

Figure 5:
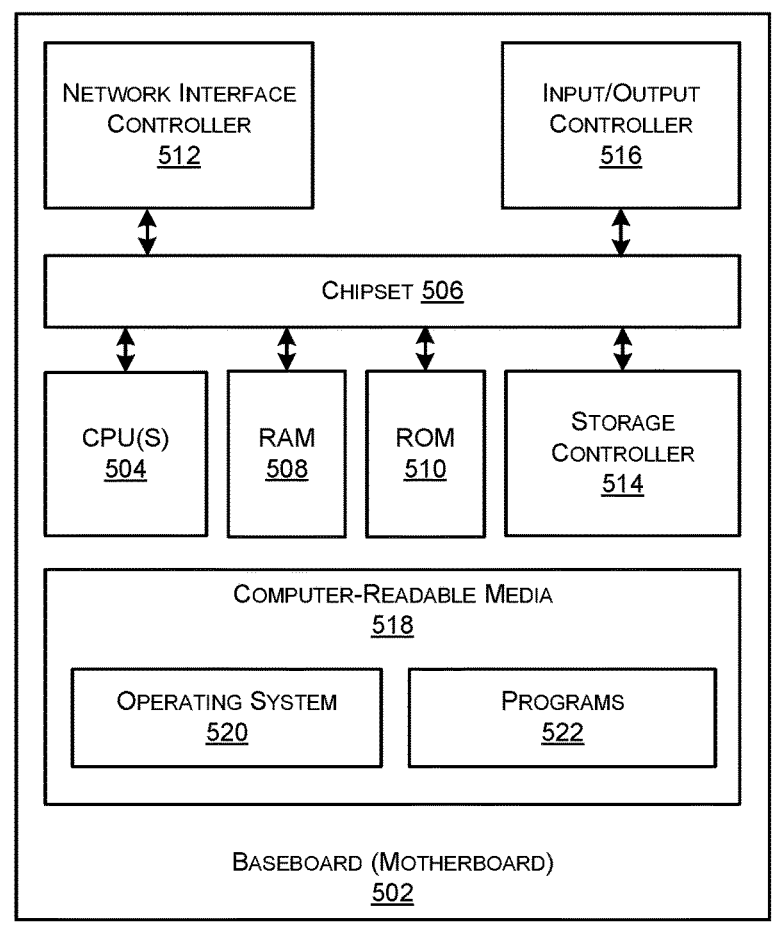
FIG. 5 is a computer architecture diagram showing an example computer hardware architecture for implementing a device that can be utilized to implement aspects of the various technologies presented herein.

FIG. 5 shows an example computer architecture for a computing device 500 capable of executing program components for implementing the functionality described above. In configurations, one or more of the computing devices 500 may be used to implement one or more of the components of FIGS. 1-4. The computer architecture shown in FIG. 5 illustrates a conventional server computer, router, switch, workstation, desktop computer, laptop, tablet, network appliance, e-reader, smartphone, or other computing device, and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

inserting a service within a data link layer of a network;

registering a service and one or more borders of a fabric network of the network to a service control plane of the network based on service monitoring, wherein registering the service comprises registering a service insertion policy and a corresponding routing locator (RLOC) of each of the one or more borders;

receiving, at an edge of a fabric network of the network, a packet destined for a destination media access control (MAC) address;

receiving, by the service control plane from the edge, a first map-request message for the destination MAC address;

based at least in part on receiving the first map-request message, providing, by the service control plane to the edge, a first map-reply message, wherein the first map-reply message comprises the service insertion policy for the destination MAC address;

based at least in part on the first map-reply message, forwarding, by the edge, the packet to the one of the one or more borders; and forwarding, by the one of the one or more borders, the packet to the service.

2. The method of claim 1, further comprising:

forwarding, by the service, the packet to the one of the one or more borders;

receiving, by the service control plane from the one of the one or more borders, a second map-request message;

based at least in part on receiving the second map-request message, providing, by the service control plane to the one of the one or more borders, a second map-reply message, wherein the second map-reply message comprises an RLOC for the destination MAC address; and forwarding, by the one of the one or more borders, the packet to the destination MAC address.

3. The method of claim 1, wherein providing, by the service control plane to the edge, the first map-reply message, comprises:

providing, by the service control plane, a destination group tag for the service insertion policy; and applying, by the edge, the service insertion policy, wherein applying the service insertion policy comprises the forwarding, by the edge, the packet to the one of the one or more borders connected to the service.

4. The method of claim 1, wherein providing, by the service control plane to the edge, the first map-reply message, comprises:

providing, by the service control plane to the edge, the first map-reply message, wherein the first map-reply message comprises the RLOC for one of the one or more borders connected to service.

5. The method of claim 1, further comprising:

upon boot-up of the edge, providing, by the service control plane to the edge, the service insertion policy, wherein the service insertion policy comprises an instruction to route traffic destined for the destination MAC address to the one of the one or more borders to forward the traffic to the service to apply the service.

6. The method of claim 5, further comprising:

redirecting, by the edge, unresolved traffic to the one of the one or more borders.

7. The method of claim 5, further comprising:

dropping, by the edge, unresolved traffic.

8. The method of claim 1, wherein the service insertion policy is based at least in part on one of a security group tag (SGT) or a destination group tag (SGT) of traffic within the network.

9. A system comprising:

one or more processors; and one or more non-transitory computer-readable media storing computer-executable instructions that, when executed by the one or more processors, cause the one or more processors to perform actions comprising:

inserting a service within a data link layer of a network;

registering a service and one or more borders of a fabric network of the network to a service control plane of the network based on service monitoring, wherein registering the service comprises registering a service insertion policy and a corresponding routing locator (RLOC) of each of the one or more borders;

receiving, at an edge of a fabric network of the network, a packet destined for a destination media access control (MAC) address;

receiving, by the service control plane from the edge, a first map-request message for the destination MAC address;

based at least in part on receiving the first map-request message, providing, by the service control plane to the edge, a first map-reply message, wherein the first map-reply message comprises the service insertion policy for the destination MAC address;

based at least in part on the first map-reply message, forwarding, by the edge, the packet to the one of the one or more borders; and forwarding, by the one of the one or more borders, the packet to the service.

10. The system of claim 9, wherein the actions further comprise:

forwarding, by the service, the packet to the one of the one or more borders;

receiving, by the service control plane from the one of the one or more borders, a second map-request message;

based at least in part on receiving the second map-request message, providing, by the service control plane to the one of the one or more borders, a second map-reply message, wherein the second map-reply message comprises an RLOC for the destination MAC address; and forwarding, by the one of the one or more borders, the packet to the destination MAC address.

11. The system of claim 9, wherein providing, by the service control plane to the edge, the first map-reply message, comprises:

providing, by the service control plane, a destination group tag for the service insertion policy; and applying, by the edge, the service insertion policy, wherein applying the service insertion policy comprises the forwarding, by the edge, the packet to the one of the one or more borders connected to the service.

12. The system of claim 9, wherein providing, by the service control plane to the edge, the first map-reply message, comprises:

providing, by the service control plane to the edge, the first map-reply message, wherein the first map-reply message comprises the RLOC for one of the one or more borders connected to the service.

13. The system of claim 9, wherein the actions further comprise:

upon boot-up of the edge, providing, by the service control plane to the edge, the service insertion policy, wherein the service insertion policy comprises an instruction to route traffic destined for the destination MAC address to the one of the one or more borders to forward the traffic to the service to apply the service.

14. The system of claim 13, wherein the actions further comprise:

redirecting, by the edge, unresolved traffic to the one of the one or more borders.

15. The system of claim 13, wherein the actions further comprise:

dropping, by the edge, unresolved traffic.

16. The system of claim 9, wherein the service insertion policy is based at least in part on one of a security group tag (SGT) or a destination group tag (SGT) of traffic within the network.

17. One or more non-transitory computer-readable media storing computer-executable instructions that, when executed by one or more processors, cause the one or more processors to perform actions comprising:

inserting a service within a data link layer of a network;

registering a service and one or more borders of a fabric network of the network to a service control plane of the network based on service monitoring, wherein registering the service comprises registering a service insertion policy and a corresponding routing locator (RLOC) of each of the one or more borders;

receiving, at an edge of a fabric network of the network, a packet destined for a destination media access control (MAC) address;

receiving, by the service control plane from the edge, a first map-request message for the destination MAC address;

based at least in part on receiving the first map-request message, providing, by the service control plane to the edge, a first map-reply message, wherein the first map-reply message comprises the service insertion policy for the destination MAC address;

based at least in part on the first map-reply message, forwarding, by the edge, the packet to the one of the one or more borders; and forwarding, by the one of the one or more borders, the packet to the service.

18. The one or more non-transitory computer-readable media of claim 17, wherein the actions further comprise:

forwarding, by the service, the packet to the one of the one or more borders;

receiving, by the service control plane from the one of the one or more borders, a second map-request message;

based at least in part on receiving the second map-request message, providing, by the service control plane to the one of the one or more borders, a second map-reply message, wherein the second map-reply message comprises an RLOC for the destination MAC address; and forwarding, by the one of the one or more borders, the packet to the destination MAC address.

19. The one or more non-transitory computer-readable media of claim 17, wherein providing, by the service control plane to the edge, the first map-reply message, comprises:

providing, by the service control plane, a destination group tag for the service insertion policy; and applying, by the edge, the service insertion policy, wherein applying the service insertion policy comprises the forwarding, by the edge, the packet to the one of the one or more borders connected to the service.

20. The one or more non-transitory computer-readable media of claim 17, wherein providing, by the service control plane to the edge, the first map-reply message, comprises:

providing, by the service control plane to the edge, the first map-reply message, wherein the first map-reply message comprises the RLOC for one of the one or more borders connected to the service.

* * * * *